June 14, 1960     D. McKINLAY, JR     2,941,147

VARIABLE SENSITIVITY MEASURING APPARATUS

Filed Sept. 8, 1952

INVENTOR.
Donald McKinlay, Jr
BY
E.C. Sanborn
Attorney

United States Patent Office 2,941,147
Patented June 14, 1960

2,941,147

VARIABLE SENSITIVITY MEASURING APPARATUS

Donald McKinlay, Jr., Bethany, Conn., assignor to The Bristol Company, Waterbury, Conn., a corporation of Connecticut Filed Sept. 8, 1952, Ser. No. 308,487

6 Claims. (Cl. 324—99)

This invention relates to electrical computing circuits of the null or balanceable class, and more especially to method and means for minimizing sensitivity variation in the detector branch of such circuits when they are employed in applications involving a non-linear relationship between changes in the measured variable and increments of movement in the circuit-balancing instrumentality. In conventional potentiometer networks wherein equal changes in the position of the potential-selecting contact with respect to the slide-wire or equivalent component of the circuit are attended by equal increments of potential, the sensitivity of response at different portions of the measuring range is normally uniform, and this sensitivity can be given a selected magnitude by suitably proportioning the detector branch to the other portions of the network. While it is desirable that the detector sensitivity be thus matched to circuit characteristics, the matching is not so critical as to exclude such non-linearity of response as might attend variations in the over-all impedance of the network due to changes in slide-wire setting; and, in fact, minor variations in linearity of the network may not introduce prohibitive changes in the response of the detector system.

In measuring networks adapted to computation circuits, especially those for compensating for an non-linear relationship between a measured variable and its electrical equivalent, it frequently becomes necessary to design the circuit so that the change in potential for a given displacement of the slide-wire contact or its equivalent at one portion of the working range will be many times the magnitude of the corresponding change at another portion, with the consequent result that the detector will be abnormally sensitive in the first instance and objectionably sluggish in the second. In servo-actuated instruments of the self-balancing class, this characteristic is reflected in instability and hunting at one part, and "mushiness" at another part, of the scale. This phenomenon may be present to a greater or less extent where slide-wires of a tapered or otherwise non-uniform conformation are used, and it is almost inseparable from those networks wherein the servomotor acts to adjust simultaneously a plurality of contacts, whereby to select a portion of the potential across a given slide-wire, and at the same time to vary the voltage impressed upon the terminals thereof. Such expedients are common in networks adapted to the computation of, or compensation for, squares, square roots, and other functions of variables wherein the basic measuring devices are characterized by such non-linear laws of response.

Consideration may be given, for example, to conditions characterizing potential division along the slide-wire in a network adapted to computations involving a quadratic law, as for the squaring of a quantity or for the extraction of square root. By virtue of the fact that a number of variables encountered in practical engineering tend to produce measureable results related thereto by a quadratic law, the squared function is especially important in the treatment of such circuits and networks. As examples of measurements involving this relationship may be mentioned the determination of alternating current values by thermal means, and measurements of fluid flow as accomplished by means of Pitot tubes, an orifice plate, or a Venturi tube.

In null-type balanceable networks where direct current is used, the sensitivity of response is usually limited by the characteristics of the galvanometer or other device used as a detector; and all other factors being equal, the maximum transfer of energy, and hence the maximum sensitivity, is obtained when the resistance of the detector is equal to that of the rest of the circuit as "seen from" the galvanometer. Since almost unlimited amplification is applicable in alternating-current circuits, these are not so restricted; and for such networks it has been customary to provide in the detector branch a relatively high impedance, which in many instances may be considered as substantially infinite in so far as concerns any effect on the other branches.

It is an object of the present invention to provide means whereby the sensitivity of response of the detector element in a non-linear electrical computing circuit of the self balancing class may be rendered effectively uniform throughout the working range of the apparatus.

It is a further object to accomplish the foregoing result without substantial addition to the components normally constituting a self balancing measuring system of the class to which the invention is adapted.

In carrying out the purposes of the invention it is proposed to modify the sensitivity of the detector branch of the network by deliberately mismatching the impedance of said branch to that of the network to the extent that abnormally high sensitivity is obtained in those portions of the scale where the increments of potential with changes in the position of the slide-wire contact are relatively small, and progressively to sacrifice a large proportion of said sensitivity as the measurement attains that part of the range where said increments are of relatively great magnitude.

No inherent novelty attends the measurement of powers and roots and other non-linear functions by means of voltage dividers of the slide-wire type; and for a general discussion of some methods for accomplishing such measurements reference may be had to the book Electronic Instruments published by the Office of Scientific Research and Development of the National Defense Research Committee (McGraw-Hill, 1948). On page 103 of this work is described an approximate method of determining square roots; and in section 5.11, beginning on page 120, is given a general treatment of methods for obtaining powers and roots. These may be taken as typical of the computations possible with self-balancing networks; and the characteristic of non-linearity introduced by such networks gives rise to the problem of variable sensitivity, whose solution lies in the province of the present invention.

Figure 5:
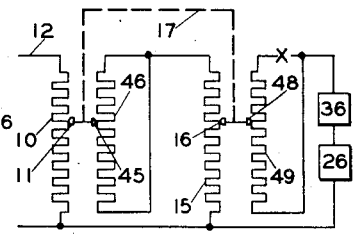

Fig. 5 diagrammatically illustrates a practical modification of the circuit, whereby the desired characteristic may be imparted to the circuit to an extent greater than that appearing in the basic system.

Figure 1:
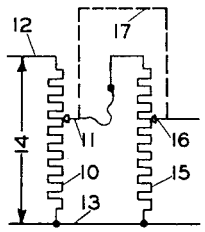
Fig. 1 is a simplified diagram illustrating a well known method of introducing a non-linear law into a self-balancing network.

The basic diagram in Fig. 1 may be taken as typical of methods for introducing predetermined non-linear mathematical relationships into networks having only linear variable components. A uniformly distributed slide-wire resistor 10, provided with a translatable contact member 11, is connected as a voltage-divider between two conductors 12 and 13 comprising the terminals of a constant voltage supply 14. Between contact member 11 and the conductor 13 is connected a second uniform slide-wire 15 constituting a potentiometer having a translatable contact member 16. Since the potential impressed upon the slide-wire 15 will vary with displacement of the contact 11 along the voltage-divider 10, and since the portion of said potential appearing between the contact 16 and conductor 13 will vary with displacement of the latter contact along the potentiometer slide-wire 15, it follows that the potential between contact 16 and conductor 13 will be a function of the combined displacements of the contacts 11 and 16 along their respective slide-wires. If the value of the resistor 15, or of the circuit loop, in which it is included, be made such that the current therethrough does not appreciably disturb the potential distribution across the voltage-divider 10, the potential of the contact 16 relative to conductor 13 will bear to the voltage of the source 14 a relationship represented by the product of the linear displacements of the respective contacts 11 and 16 from said conductor. Furthermore, if the contacts, by means of a suitable mechanical interconnection 17 be incorporated in a common assembly so as to be integrally movable, the ratio of the potential of the contact 16 with respect to the supply voltage will be proportional to the square of the linear displacement of the assembly 17. In other words, under the circumstances mentioned, and with the potential of the source 14 maintained at a constant value, the displacement of the contact assembly will be proportional to the square root of the potential derived from the slide-wire 15 by the contact 16.

Figure 2:
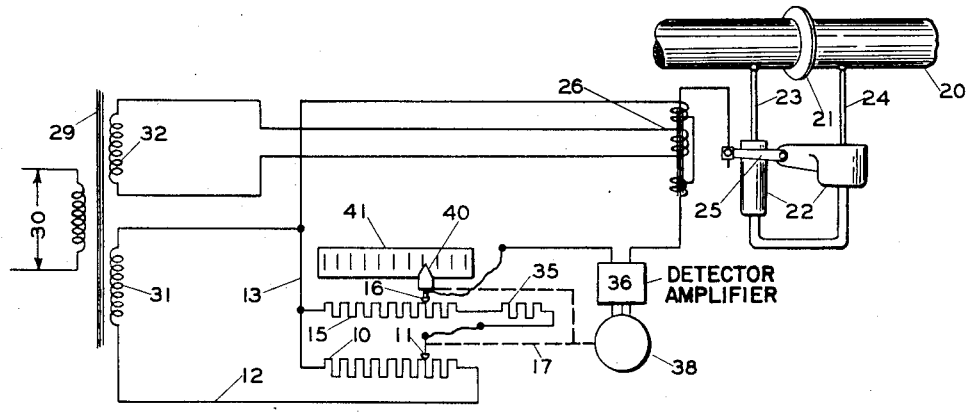
Fig. 2 is a diagram showing application of the principle of Fig. 1 to a fluid flow meter having an inherently quadratic law.

In Fig. 2 is shown diagrammatically the manner in which a circuit of the type shown in Fig. 1 may be applied in the measurement of an electromotive force varying nonlinearly with a quantity to be determined, and in the expression of the values of that quantity upon a uniformly graduated scale. In the interest of simplicity, and because of its inherently quadratic law, there has been selected as an example a flow meter of the type wherein a static pressure differential is developed due to an obstruction in the form of a constricted orifice, inserted in a pipe or conduit through which is passing a fluid medium whose velocity it is desired to determine.

The numeral 20 designates a conduit adapted to carry the fluid under measurement, there being inserted in said conduit an orifice-plate 21 of predetermined characteristics. A differential manometer 22, connected to said conduit by tubes 23 and 24 on the "upstream" and "downstream" sides respectively of said orifice plate, includes a displaceable arm 25 adapted to be deflected in proportion to the difference of the pressures impressed on the two sides of the manometer through the tubes 23 and 24. The arm 25 carries the movable element of any suitable transducer apparatus for converting the deflections of said arm into proportional electrical effects. Such transducer may take any desired form, such as a slide-wire combination or other variable impedance for applying between the conductor 13 and contactor 16 a voltage corresponding to the displacement of the arm 25. In the present embodiment the member 26 is shown as advantageously constituting the movable element of a linear transformer having a primary winding adapted to alternating current energization and also having opposed secondary windings, whereby to develop a secondary output potential proportional to the displacement of the arm 25, and therefore directly proportional to the pressure differential in the manometer. A linear transformer of a type suited to the purposes of the invention is described in U.S. Letters Patent No. 2,427,866, granted to W. D. McGeorge, September 23, 1947.

Power for operation of the apparatus is derived from a transformer 29 adapted to energization from an alternating-current supply 30, and having two secondary windings 31 and 32. These secondary windings may be duplicates, or they may bear different turn ratios to the primary winding, as practical conditions may dictate. The principal requirement, and that which is substantially met in well designed transformers, is that the ratio of the windings be constant under all operating conditions, and that their output voltages not differ by an appreciable phase-angle. The secondary winding 31 is connected to the conductors 12 and 13 of the network shown in Fig. 1, and the winding 32 is connected to the primary winding of the linear transformer 26.

In order to minimize the distortion of potential gradient along the resistor 10 by current flowing through the resistor 15, the former is given a relatively low, and the latter a relatively high, resistance value. Satisfactory performance has been obtained when these resistance values are of the order of 160 ohms and 7,000 ohms respectively, the constant potential across the slide-wire 10 being given a value of the order of 500 millivolts. Flexibility of operation renders it desirable that there be placed in series with the resistor 15 a further resistor 35 having a limited adjustment and a nominal value of the order of 1,000 ohms.

The secondary terminals of the linear transformer 26 are connected between the conductor 13 and the movable contact member 16 through a suitable detector-amplifier 36. A reversible motor 38 adapted to be controlled through said detector-amplifier in accordance with the magnitude and sense of unbalance in the measuring network, is mechanically attached to the contact assembly 17 to adjust the same in a manner to reduce toward zero the potential in the loop comprising the secondary winding of the transformer 26, the detector-amplifier 36 and the portion of the slide-wire 15 lying between the contact member 16 and the conductor 13. A simple form of servo system adapted to the continuous balancing of an alternating-current network is set forth and described in U.S. Letters Patent No. 1,586,233, granted to H. Anschutz-Kaempfe, May 25, 1926.

A pointer 40, movable with the contact assembly 17 and cooperating with a stationary graduated scale 41 provides an indication of the deflected position of the contact assembly 17, and thus of the displacement of the mechanically associated contact members 11 and 16.

The high amplification available in alternating-current detector-amplifiers, as hereinbefore pointed out, has rendered it customary to provide a detector-amplifier having a relatively high impedance, which in many instances may be considered as infinite in so far as concerns any effect on other branches of the associated network. If the detector-amplifier 36 in the measuring system shown in Fig. 2 were of this nature, and were given sufficient sensitivity to provide a satisfactory response to increments of potential developing from displacements of the contact assembly 17 at the lower end of the measuring range, it will be apparent that the sensitivity would be unnecessarily, and objectionably, high at the upper end of the scale.

Assuming, for example, each of the slide-wires 10 and 15 to have a definition of $\frac{1}{10}\%$ (i.e. to have 1000 convolutions) and to be so relatively proportioned that the latter slide-wire has no significant loading effect on the former, and the detector-amplifier impedance to be of such high magnitude as to have no appreciable loading effect on the network; then, with a potential of 1 volt applied to the terminals of the slide-wire 10, the minimum increment at the top of the range would be: $1-(0.999 \times 0.999)=0.002$ volt (approx.) $=2 \times 10^{-3}$ and the minimum increment at the bottom of the range would be: $0.001 \times 0.001 - 0 = 1 \times 10^{-6}$ volt. Thus, the detector-amplifier would be required to provide a satisfactory response to potential increments varying through a range of from $2 \times 10^{-3}$ to $1 \times 10^{-6}$, or a ratio of 2,000 to 1, which is a severe requirement not conducive to satisfactory operation of the servo system.

On the basis of the foregoing example there may be developed a formula expressing the sensitivity at different points of the operating range. If the impedance of the detector-amplifier branch have a finite value there will flow through it a current in terms of which the magnitude of response may be expressed. The impedance of the detector-amplifier branch is made up of three components, that of the source to be measured, that of the detector-amplifier, and that of the portion of the slide-wire included in the loop. Since the former two components like the latter, can be shown to be substantially resistive in their effects, all three may for the present purpose be directly added, so that the impedance of the loop becomes $$Z_t + Z_g + DR_s$$

where $Z_t$ and $Z_g$ designate the impedances of the source, linear transformer 26, and of the detector-amplifier respectively, D the position of the slide-wire contact expressed as a proportion of its total possible excursion, and $R_s$ the resistance of the slide-wire. (In subsequent computations, $Z_t$ will be combined with, and considered a part of, $Z_g$.) The impedance of the detector loop is thus made up of two components, one of which, $Z_g$, is constant for any established set of conditions, and the other of which, $DR_s$, is progressively varied with displacement of the contact assembly on the slide-wires. Expressing the sensitivity of the system as the ratio of the change of current in the detector-amplifier loop to an increment of displacement of the slide-wire contact, there will now be shown the manner in which the sensitivity is affected by selection of the value K, which is taken to represent the ratio $Z_g/R_s$.

Selecting the relative values of the slide-wire resistances to be such that the current through the slide-wire 15 does not appreciably disturb the potential gradient in the slide-wire 10, the current in the detector-amplifier loop may be expressed as $$I = \frac{D^2 E}{(K+D) R_s}$$

Differentiating the above expression in order to establish the relation between slide-wire contact displacement and change of current in the detector-amplifier loop, $$S \text{(sensitivity)} = \frac{dI}{dD} = \frac{(K+D)R_s 2DE - (D^2 E) R_s}{(K+D)^2 R_s^2}$$

$$= \frac{DE(2K+D)}{(K+D)^2 R_s} = \frac{D(2K+D)}{(D+K)^2} \times \frac{E}{R_s}$$

Figure 4:
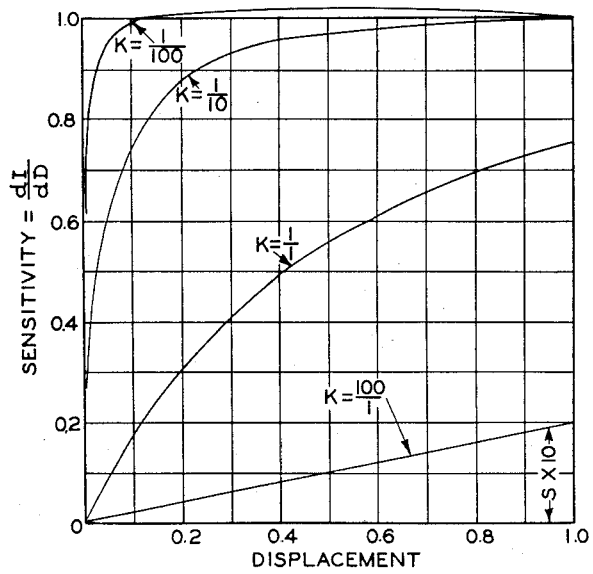
Fig. 4 is a graphic representation of characteristics of the apparatus as the principle of the invention is applied to different extents.

Fig. 4 shows a group of curves based on the foregoing equation, these being plotted with vertical ordinates representing sensitivity and horizontal ordinates representing displacement of slide-wire contacts from a zero of reference. In these curves, the constant K, representing the ratio $Z_g/R_s$ is given selected values of 100/1, 1/1, 1/10 and 1/100, respectively. (The first of these curves is drawn to a vertical scale 10 times that of the others.) The constant $E/R_s$ is given an arbitrary value of 1.

From inspection of the curves, it will be seen that where the value of K is 100 the sensivity increases uniformly with the value of the deflection, and is represented by a substantially straight line passing through the zero point. Where the selected value of K is 1, the rate of increase in sensitivity tends to fall off as the value of D rises. As K is further lessened, the value of S tends progressively to rise more rapidly in the lower, and to become constant in the upper, portions of the range. Where K is given a value of $1/100$, the sensitivity is substantially constant throughout the upper $9/10$ of the working range.

Since a considerable range of sensitivity variation can be tolerated without seriously impairing servomotor performance, it is not necessary to tax the detector-amplifying system in an attempt to approach too closely to the theoretical ideal; and it has been found that satisfactory performance of a balancing network adapted to compensation for a quadratic law will ordinarily be obtained where the value of K is selected of the order of $1/10$. Performance with values of K equal to about $1/10$, or lower, is found vastly superior to that obtained with K values substantially greater than $1/10$.

Figure 3:
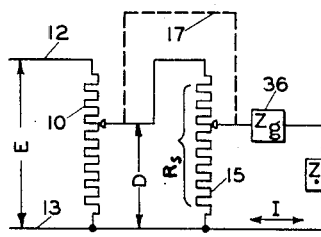
Fig. 3 is a diagram similar to that of Fig. 1, but quantitatively designating the several components of the circuit, for purposes of computation.

In Fig. 5 is shown the manner in which a common constructional feature of self-balancing instruments may be utilized in conjunction with the hereinbefore described method and means in carrying out the purposes of the invention. While in Figs. 1, 2 and 3, the contact member 16 which traverses the slide-wire 15 is indicated as connected into the detector loop by means of a flexible lead, it has become a common practice in instruments of this class to utilize a sliding connection instead of a flexible conductor. This connection may be embodied in an auxiliary contact mechanically and electrically connected to the sliding contact on the measuring slide-wire, this auxiliary contact traversing a slide-wire which may, or may not, be a duplicate of that in the measuring circuit. In Fig. 5, the contact devices of both the slide-wires 10 and 15 are shown arranged in this manner. The slide-wire 10 is shown, as in the other diagrams, electrically engaged by the sliding contact member 11 which is attached to the moving element 17. Integral with the contact 11 is a further contact member 45, engaging a slide-wire 46, which in the instrument as actually constructed would commonly be closely juxtaposed to the slide-wire 10. Instead of a flexible lead to provide connection to the stationary parts of the circuit, the slide-wire 46 is utilized, both ends of said slide-wire usually being joined together and the circuit completed by means of a connection to the junction point. This mechanical arrangement eliminates flexible conductors, which are likely to interfere with the free movement of parts; and experience has shown that electrical connection between a properly designed contact member and a helical slide-wire of the materials customarily used in these instruments is more consistent and dependable then such connection between a sliding contact and a solid wire or a collector ring.

In common practice, as exemplified in the prior art, the impedance of the detector-amplifier loop is so high relatively to that of the conventional slide-wire that variations in the effective resistance of slide-wire 46 as the contact member 45 assumes various positions within its range have no appreciable effect on the sensitivity of response. In the present invention, the relatively high resistance value of the slide-wire 15 renders the variations in resistance of the current path through the short-circuited slide-wire 46 with changes in contact position of negligible significance, even though the resistance of the detector-amplifier loop be made, as hereinbefore specified, of relatively low value.

The flexible conductor by which connection is made between the sliding contact 16 and the outside circuit is replaced, like that associated with the contact 11, by an electrically and mechanically associated contact 48 traversing a stationary slide-wire 49 juxtaposed to the slide-wire 15. For the purpose of progressively varying the loop impedance with translation of the contact 48 along the slide-wire 49, the latter is made of relatively high resistance, and the loop corresponding to that formed by short-circuiting the slide-wire 46 is opened, as at the point "X" in Fig. 5. Thus, the slide-wire 49 becomes a series rheostat, serving to increase the resistance of the detector-amplifier circuit as the contacts are moved to positions representing increasing potentials in the measuring circuit, and thereby progressively reducing the sensitivity with such displacement of the contact assembly, and supplementing the desirable characteristic of the hereinbefore described circuit wherein the impedance of the detector-amplifier is made low in relation to the resistance of the measuring slide-wire.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a measuring network for providing an indication of the value of a variable, a source of electromotive force corresponding in value to a function bearing a predetermined exponential relation to said variable, variable impedance means adapted for connection across a source of constant potential and adjustable to provide a potential for balancing said electromotive force and to provide an indication bearing an exponential relation to said balancing potential inverse to said predetermined exponential relation, an alternating current balance detector-amplifier, means for opposing in the input circuit of said detector-amplifier said electromotive force and the potential derived from said variable impedance means, and means responsive to said detector-amplifier to adjust said variable impedance means and thereby adjust the value of said potential to balance said electromotive force and provide an indication proportional to the value of said variable, the electrical input impedance of said detector-amplifier and the impedance of said source of electromotive force being less than the maximum electrical impedance of said variable impedance means.

2. In a measuring network for providing an indication of the value of a variable, a source of electromotive force corresponding in value to a function bearing a predetermined exponential relation to said variable, variable impedance means adapted for connection across a source of constant potential, an alternating current balance detector-amplifier, means for opposing in the input circuit of said detector-amplifier said electromotive force and the potential derived from said variable impedance means, and means responsive to said detector-amplifier to adjust said variable impedance means and thereby adjust the value of said potential to balance said electromotive force and provide an indication proportional to the value of said variable, the electrical input impedance of said detector-amplifier and the impedance of said source of electromotive force being less than one-tenth the maximum electrical impedance of said variable impedance means.

3. In a measuring network for providing an indication of the value of a variable, a voltage divider adapted for connection across a source of constant potential and having a first translatable contact for rendering a selected portion of said potential available between said contact and a reference point in said network, a potentiometer connected between said reference point and said first translatable contact whereby to be subjected to said portion of said potential and having a second translatable contact movable in unison with said first contact, a source of electromotive force corresponding in value to a function bearing a predetermined exponential relation to said variable, displacement of said second translatable contact providing a potential for balancing said electromotive force and providing an indication bearing an exponential relation to said balancing potential inverse to said predetemined exponential relation, an alternating current balance detector-amplifier, means for opposing in the input circuit of said detector-amplifier said electromotive force and the potential derived from said second contact, and means responsive to said detector-amplifier to adjust said first and second contacts in unison and thereby adjust the value of the potential provided by said second contact to balance said electromotive force and provide an indication proportional to the value of said variable, the electrical input impedance of said detector-amplifier and the impedance of said source of electromotive force being less than that of said potentiometer.

4. In a measuring network for providing an indication of the value of a variable, a source of electromotive force corresponding in value to a function bearing a predetermined exponential relation to said variable, first variable impedance means adapted for connection across a source of constant potential and adjustable to provide a potential for balancing said electromotive force and to provide an indication bearing an exponential relation to said balancing potential inverse to said predetermined exponential relation, an alternating current balance detector-amplifier, means for opposing in the input circuit of said detector-amplifier said electromotive force and the potential derived from said first variable impedance means, the electrical input impedance of said detector-amplifier and the impedance of said source of electromotive force being less than the maximum impedance of said first variable impedance means, second variable impedance means included in the input circuit of said detector-amplifier for varying the impedance presented by the latter to said variable impedance means, means responsive to said detector-amplifier to adjust said first variable impedance means and thereby adjust the value of said potential to balance said electromotive force and to provide an indication proportional to the value of said variable, and said detector-amplifier responsive means being adapted to adjust said second variable impedance means in accordance with the portion of the range wherein measurements are being preformed.

5. In a measuring network for providing an indication of the value of a variable, a source of electromotive force corresponding in value to a function bearing a predetermined exponential relation to said variable, first variable impedance means adapted for connection across a source of constant potential and having a contact displaceable to provide a potential for balancing said electromotive force and to provide an indication bearing an exponential relation to said balancing potential inverse to said predetermined exponential relation, displacement of said contact to provide a given unit potential change at one part of the measuring range differing in magnitude from the displacement required to provide said unit potential change at another part of the measuring range, an alternating current balance detector-amplifier, means for opposing in the input circuit of said detector-amplifier said electromotive force and the potential derived from said first variable impedance means, the electrical input impedance of said detector-amplifier and the impedance of said source of electromotive force being less than the maximum impedance of said first variable impedance means, second variable impedance means included in the input circuit of said detector-amplifier for varying the impedance presented by the latter to said variable impedance means, means responsive to said detector-amplifier to adjust said first variable impedance means and thereby adjust the value of said potential to balance said electromotive force and to provide an indication proportional to the value of said variable, and said detector-amplifier responsive means being adapted to adjust said second variable impedance means for progressively increasing the impedance thereof as measurements approach the extremity of the measuring range where displacement of said contact is least in relation to changes in said potential.

6. In a measuring network for providing an indication of the value of a variable, a source of electromotive force corresponding in value to a function bearing a predetermined exponential relation to said variable, a first pair of juxtaposed slide-wires, one adapted for connection across a source of constant voltage and the other having both its extremities connected to a common conductor, an alternating current balance detector-amplifier, a second pair of juxtaposed slide-wires, one having a terminal connected to the first mentioned slide-wire of said first pair and a terminal connected to said common conductor, the other slide-wire of said second pair having a free terminal and a terminal connected to the input circuit of said detector-amplifier in series with said source of electromotive force so that voltage across the last mentioned slide-wire of said second pair is opposed to said electromotive force in the input circuit of said detector-amplifier, a pair of translatable contacts connected to each other and to said first pair of slide-wires and a second pair of translatable contacts connected to each other and connected to said second pair of slide-wires, means responsive to said detector-amplifier for translating all said contacts in unison, said second pair of translatable contacts providing an indication proportional to the value of said variable and bearing an exponential relation to the voltage opposed to said electromotive force inverse to said predetermined exponential relation, the electrical input impedance of said detector-amplifier and said source of electromotive force being less than the maximum impedance of the first mentioned slide-wire of said second pair.

References Cited in the file of this patent

UNITED STATES PATENTS

| | | |
|---|---|---|
| 1,171,213 | Knopp | Feb. 8, 1916 |
| 1,178,772 | Zimmerman | Apr. 11, 1916 |
| 1,524,587 | Sparkes | Jan. 27, 1925 |
| 1,614,535 | Packard | Jan. 18, 1927 |
| 2,234,573 | Neumann | Mar. 11, 1941 |
| 2,338,423 | Geyger | Jan. 4, 1944 |
| 2,452,539 | Baecher | Nov. 2, 1948 |
| 2,454,520 | Moore | Nov. 13, 1948 |
| 2,611,812 | Hornfeck | Sept. 23, 1952 |